US006329796B1

United States Patent
Popescu

(10) Patent No.: US 6,329,796 B1
(45) Date of Patent: Dec. 11, 2001

(54) POWER MANAGEMENT CIRCUIT FOR BATTERY SYSTEMS

(75) Inventor: Serban-Mihai Popescu, San Jose, CA (US)

(73) Assignee: O2 Micro International Limited, Grand Cayman (KY)

( * ) Notice: Subject to any disclaimer, the term of this patent is extended or adjusted under 35 U.S.C. 154(b) by 0 days.

(21) Appl. No.: 09/624,918

(22) Filed: Jul. 25, 2000

(51) Int. Cl.[7] ................................................. H01M 10/46
(52) U.S. Cl. .............................................. 320/134; 320/136
(58) Field of Search ..................................... 320/134, 136

(56) References Cited

U.S. PATENT DOCUMENTS

| | | | |
|---|---|---|---|
| 5,694,025 | * 12/1997 | Oglesbee et al. | 320/49 |
| 5,898,234 | * 4/1999 | Kitagawa | 307/48 |
| 5,903,137 | * 5/1999 | Freiman et al. | 320/163 |
| 5,969,436 | * 10/1999 | Chalasani et al. | 307/64 |
| 5,994,875 | * 11/1999 | Lee | 320/132 |

* cited by examiner

*Primary Examiner*—Edward H. Tso
(74) *Attorney, Agent, or Firm*—Hayes, Soloway, Hennessey, Grossman & Hage, P.C.

(57) ABSTRACT

A power management circuit for battery systems composed of a switch defining a single charge/discharge path. The switch is selectively controlled using analog signals to couple a battery to a power source for charging, or to couple the battery to an active load. For charging, the switch is controlled by a controller circuit that monitors the battery voltage, the power source and the individual battery cells. The battery is only coupled to the power source if it is determined that the power source is present and that each of the battery cells is capable of receiving a charge. During discharge, the controller monitors the discharge current from the battery and compares this value to a threshold current. If the discharge current falls below the threshold, the switch is controlled to decouple the battery from the load. In this way, an overcharge condition is avoided if, for example, a power source is reapplied to the system. In a multiple battery system (where the battery and battery circuits are connected in parallel to a load and a power source), the use of the threshold current prevents a cross-conduction between batteries.

30 Claims, 3 Drawing Sheets

POWER MANAGEMENT CIRCUIT FOR BATTERY SYSTEMS

BACKGROUND OF THE INVENTION

1. Field of the Invention

The present invention relates to a battery power management circuit. More particularly, the present invention provides a circuit topology that needs only a single path to both charge and discharge batteries, and an intelligent switching mechanism to switch between batteries in a multiple battery system. The present invention has general utility wherever battery charging circuits are employed, and where multiple batteries are used; and specific utility in portable devices, for example, portable computers and the like.

2. Description of Related Art

Numerous battery charging topologies exist in the art. For portable device applications, it is desirable to have charger circuits that both control the battery as a power source and permit charging of the battery when an external power source is available. It is also desirable to reduce the component count, so that the charging/discharging circuit can be implemented with relative ease.

Rechargeable batteries, i.e., secondary batteries, have been widely used to provide electrical power for driving battery powered electronic appliances such as, by way of example, portable radio cassette players, portable computers, camcorders, cellular telephones and other devices. Alkaline batteries such as nickel cadmium (Ni—Cd) or nickel metal hydride (Ni—MH) batteries have been generally used as the secondary battery. Recently, lithium ion (Li-ion) batteries with an organic electrolytic cell have gained popularity in high-end portable electronic devices because they exhibit high energy density, low temperature characteristics, and stable storage capability.

Rechargeable batteries require an electronic charger for recharging depleted batteries. A charger should include an internal charger circuit incorporated into the battery powered appliance. A charger will begin charging the battery whenever the device is powered by alternating current (i.e., AC) power. External battery chargers accepting one or more batteries to be charged, are equipped with an independent power supply and connectors.

Although rechargeable batteries have various types of battery chemistry, battery pack voltage, and battery pack capacity, there have been few methods of charging the batteries adopted in battery chargers. Generally, the charging method is either a constant voltage charging process or a constant current charging process. Constant voltage charging applies a constant voltage that is higher in amplitude than the nominal voltage of the battery across the terminals of a battery. Constant voltage charging process is typically used for charging a backup battery where frequent charging and discharging is not occurring. The charging voltage is continuously applied to the battery. On the other hand, the constant current charging process applies a constant current to the battery irrespective of any increase in the voltage across the terminals occurring as the charging progresses. Constant current charging is useful for rapidly charging a battery. Constant current charging however, requires a time limit in order to avoid damage of the battery due to overcharging.

U.S. Pat. No. 5,898,234 provides a power supply circuit that uses a single switch to control both charging and discharging. The circuit is composed of a switch for enabling and disabling a charge current and a charge control unit for controlling the switch in accordance with the charge current, the switch being provided in a path shared by the charge current and a discharge current and including a power feed status detection unit for detecting a normal supply voltage of an external power supply source, an absence of a supply of a voltage from the external power supply source, and a drop in a voltage supplied by the external power supply source, and the charge control unit controlling charging of the electric battery by controlling the switch while the power feed status detection unit detects the normal supply voltage of the external power supply source, closing the switch when the power feed status detection unit detects an absence of a supply of a voltage from the external power supply source or a drop in a voltage supplied by the external power supply source, so as to form a discharge path connecting the electric battery and a load, thus supplying power from the electric battery to the load via the switch. Significantly, this patent discloses a current sensing circuit that monitors the discharge current from the battery. This circuit includes a sensing portion (via a sense resistor), an A/D converter and a processor. The sensed signal is digitized, and the processor controls the gate of the switch based on this value. One disadvantage of this approach is that digital circuits are inherently slower than analog circuits. When an external AC adapter is removed from the system, the battery will provide power to the load. However, this does not happen instantaneously. Thus, to energize the load during transition from external power to battery power, the system DC/DC converter includes a capacitor that bleeds energy into the load during this period. The longer the period, the larger the capacitor must be. Thus, in the digital switching topology provided in this patent, it is required to have a substantially large capacitor to supply power to the load during the transitional period. Since it is desirable in portable applications to reduce both component count and component size, it would be undesirable to utilize a digital switching topology for these applications.

Similarly, U.S. Pat. No. 5,903,137 issued to Freiman et al. provides a battery pack for use in a portable computing system includes a transistor that is used both for inhibiting charging of the batteries within the system and for limiting the voltage across the batteries in the battery pack. Rather than having two separate devices to inhibit and regulate, this single transistor performs the functions of both, thus reducing component count in a battery pack.

In U.S. Pat. No. 5,994,875, issued to Lee, a battery charging apparatus is provided for use with batteries that require charging in a constant current mode and/or constant voltage mode. The charging apparatus includes a constant current charging control circuit converting the charging current supplied with the battery into a voltage signal and applying the voltage signal to a feedback input terminal of a switching regulator in response to a charging speed control signal F_Q, and a constant voltage charging control circuit providing a control signal to the feedback input terminal for controlling constant voltage charging if the battery voltage level has reached a preset voltage level, whereby a constant voltage charging is possible during the charging operation in response to a charging mode selection signal CHG_MOD. A microcomputer produces the charging mode selection signal CHG_MOD when it is detected the charging voltage of the battery in the constant current mode and the detected voltage reached to a preset level in order to convert the charging mode into the constant voltage mode. Further, a charging speed control signal F_Q is produced to enable the switching regulator to perform quick charging operation. With this arrangement, the constant voltage (CV) charging mode can be performed when the battery is in the preset condition, regardless of type of batteries. In addition, by provision of a protection circuit, possible damage of the CV charging control circuit due to the excessive static or surge is effectively prevented. Other charging topologies can be found in U.S. Pat. Nos. 5,694,025 and 5,969,436.

However, each of these charging circuits require complex components to implement, and are thus costly to manufacture. Indeed, increased pressure exists to provider smaller and smaller components for portable devices, since overall board space and packaging requirements is at a premium. Moreover, none of these references control battery discharge by comparing the discharge current to a preset (programmable) threshold current.

In a single battery system, the prior art examples described above cannot instantaneously control the charge/discharge switch to prevent an overcurrent condition on the battery if the external power source is reapplied to the system. For example, external power removed, the voltage at the battery and the voltage at the common source are equal (or very nearly equal). In each of the aforementioned references, as described above, switch 26 is conducting to permit the battery to discharge. If an AC/DC adapter is then applied to the system, these voltages are still equal, but the switch is still open, which can generate damaging currents into the battery.

Likewise, in a multiple battery system, a cross conduction between batteries can occur if the switches associated with two (or more batteries) are permitted to simultaneously conduct. For example, assume a two battery system where the power source is removed. Referring again to the '137 patent, which discloses a charger topology for multiple batteries. At the time the adapter is removed, all batteries will attempt to supply power to the system. Since all battery currents are greater than power source current, thus the switches 26 will be conducting. However, if one battery has a greater potential than another battery, but both are conducting through the switch, there will be a cross conductance between batteries.

Thus, there is a need to provide a relatively simple circuit topology that prevents these situations, yet satisfies both economy of scale and space requirements.

SUMMARY OF THE INVENTION

Accordingly, the present invention solves the aforementioned drawbacks of the prior art by providing a battery charging/discharging circuit that controls both the charging power supplied to the battery, and the discharging power provided by the battery. Unlike the aforementioned prior art references, the present invention controls the battery discharge by comparing the discharge current to a programmable threshold current. In this way, the circuit of the present invention prevents an overcharge condition on the battery when an adapter is present. Additionally, in a multiple battery system, by controlling battery discharge by comparing the discharge current to a programmable threshold current, the present invention prohibits cross-conduction between batteries of different potential.

In one embodiment, the present invention provides a battery charging/discharging circuit comprising: a switch for selectively coupling a battery to a system along a charging/discharging path, or coupling the battery to a power source along the charging/discharging path. A switch controller is provided for selectively controlling the conduction state of the switch comprising a charge enable signal generator circuit for generating a first control signal indicative of the presence of the power source and the charge status of the battery, and a current comparator generating a second control signal indicative of the current being discharged by the battery; wherein the conduction state of the switch being controlled by said first or second control signal. In the most preferred embodiment, the current comparator compares the current being discharged by the battery to a programmable threshold current, where if the threshold current exceeds the discharge current, the conduction state of the switch will be controlled so as to electrically isolate the battery from the system.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE PREFERRED EMBODIMENTS

Figure 1:
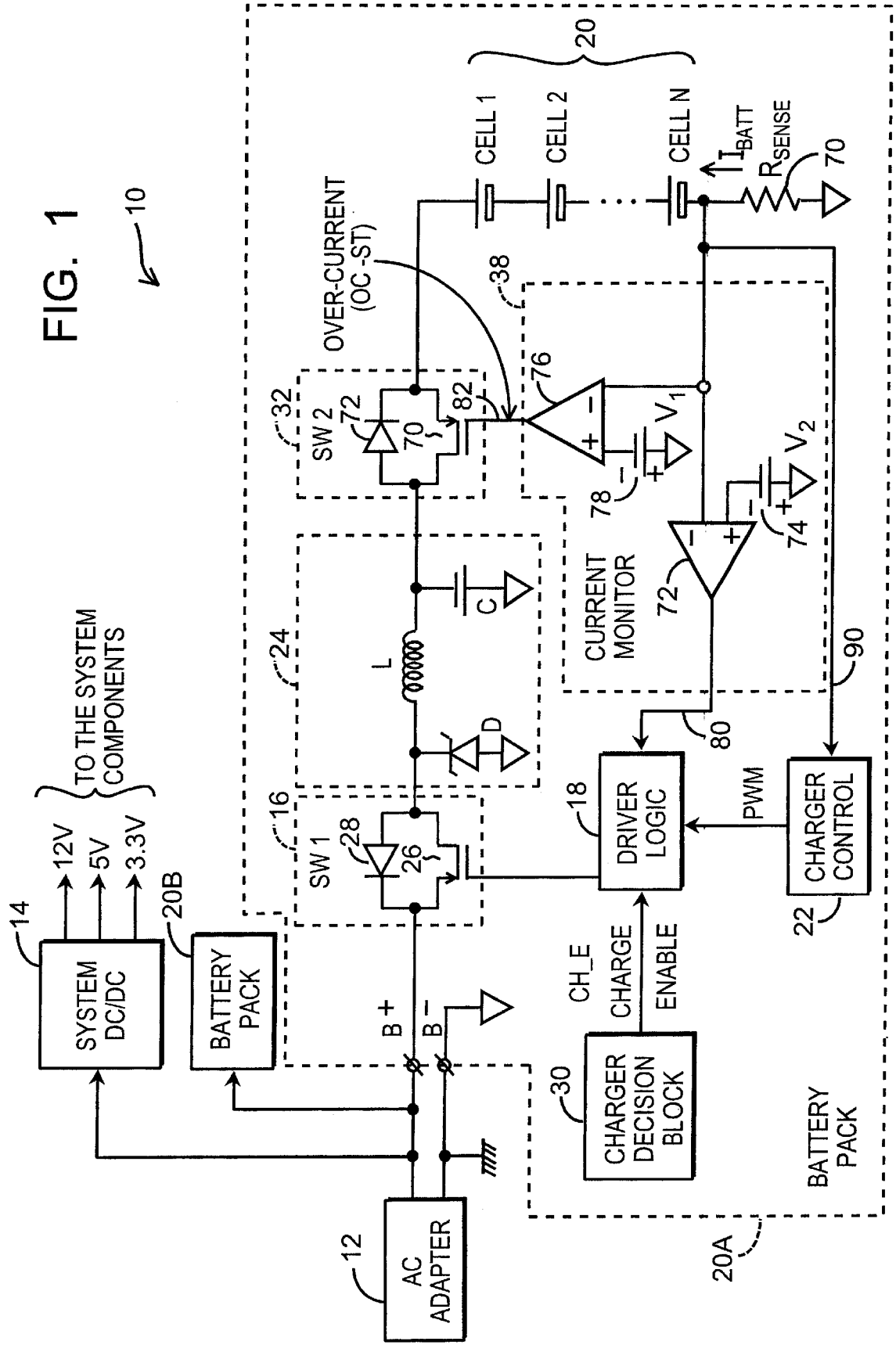
FIG. 1 is an exemplary circuit diagram of a single-path battery charging/discharging circuit of the present invention.

An exemplary battery charging/discharging circuit 10 is depicted in FIG. 1. The circuit generally includes a battery 20 comprising a plurality of battery cells Cell1, Cell2 . . . Celln, a buck converter circuit 24 for charging the battery 20, a switches 16 and 32, switch control circuitry comprising a charger decision circuit 30, driver logic 18 and a charger controller 22, and a current monitor circuit. A system DC/DC converter 14 is connected to the circuit 10 for supplying a predetermined voltage to a system. The converter 14 is coupled to the AC adapter 12 and to one or more battery systems 20A, 20B, etc., for supplying power thereto. Converter 14 typically generates a plurality of DC source voltages (e.g., 12V, 5V, 3.3V, etc.) as power supplies to an electronic device. As an overview, if the AC/DC adapter 12 is present and supplying power to the system, the circuit 10 determines if the batteries need charging and are capable of taking a charge, and if so, the switch controller 18 opens switch 16 to permit the AC/DC adapter to provide charging current to the batteries 20, as well as supply power to the system 14. Also, by monitoring the current output of the battery cells 20, switch 32 is controlled so as to prevent a short circuit condition on the battery. As a further overview, the circuit 10 of FIG. 1 is preferably adapted to monitor both the presence (or absence) of an external power source (e.g., an AC/DC adapter) and the individual cells of a battery as conditions for charging and discharging the battery. If the battery 20 is of the Lithium ion type, very strict charging tolerances must be employed, since it is possible to explode the battery if they are overcharged. Thus, the present invention monitors the voltage of each cell of the battery to ensure that an overcharge situation does not occur. These features are described in more detail below.

Figure 3:
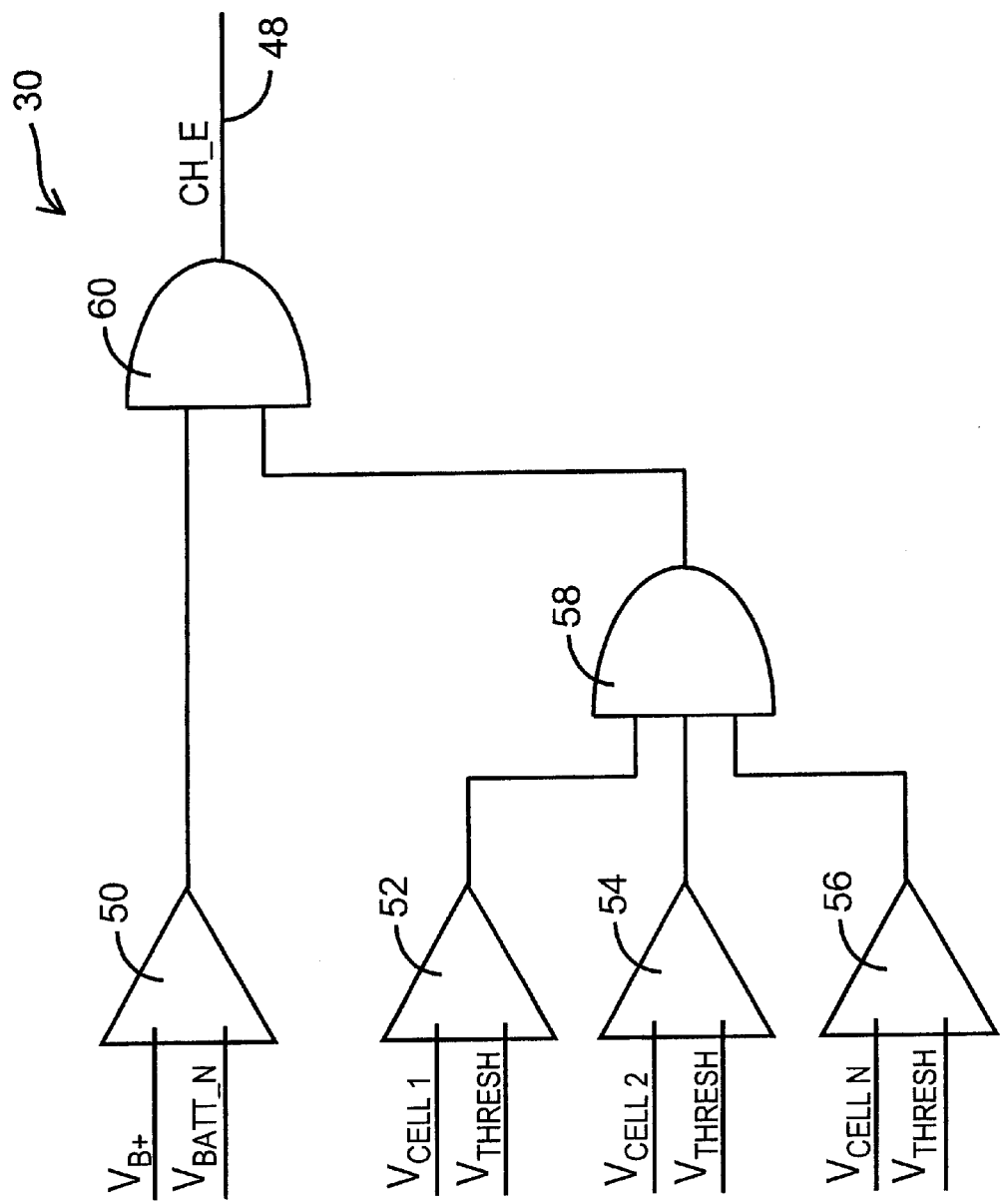
FIG. 3 is an exemplary circuit diagram for obtaining a charging/discharging control signal of FIG. 1.

Referring to FIGS. 1 and 3, the charger decision block 30 generates a charge enable signal 30 based on the voltage at the B+ node, and the individual voltages of the battery cells, as described below. The charge enable signal is used to control the overall operation of the circuit of FIG. 1. In simplest form, the preferred circuit shown for the charger decision block 30 in FIG. 3 is comprised of a first comparator 50 and one or more second comparators 52, 54, and 56 (one for each cell, Cell1, Cell2 ... Celln, of the battery 20), and AND gates 58 and 60. The first comparator 50 compares the battery voltage $V_{Batt\_n}$ with the node voltage $V_{B+}$, to determine if an AC/DC adapter 12 is present (i.e. connected to nodes B+ and B−). If $VB_+>V_{Batt\_n}$ then comparator 50 generates a high output signal, since this indicates that an adapter is present. Thus, comparator 50 operates to determine the greatest voltage at the B+ and B− nodes. The output signal of comparator 50 is one input of AND gate 60, as shown. Comparators 52, 54 and 56 monitor the individual battery cell voltages, $V_{cell1}$, $V_{cell2}$ ... $V_{celln}$, respectively, and compare the cell voltages to a programmable threshold voltage $V_{Thresh}$. For typical Lithium ion batteries, the maximum charge tolerated on any cell is about 4.300 volts. Thus, it is preferably that $V_{Thresh}$ be a value below this maximum voltage. For example, $V_{Thresh}$ can be programmed at 4.200 Volts (+/−50 mV.). Of course, this is just an example, and $V_{Thresh}$ can be set to any appropriate amount, as required. In any case, it is preferable to have a high precision voltage generator (not shown) to generate $V_{Thresh}$. If $V_{Thresh}>$ each of $V_{cell1}$, $V_{cell2}$ ... $V_{celln}$, then comparators 52, 54 and 56 generate a high output signal which is feed into AND gate 58. The output of AND gate 58 will, of course, be likewise high. If any Of $V_{cell1}$, $V_{cell2}$ ... $V_{celln}$ are $>V_{Thresh}$, then the output of AND gate 58 is low. The output of AND gate 58 is another input to AND gate 60. The output of AND gate 60 is the charge enable signal 30. Only if $V_{Batt}>V_{B+}$ and $V_{Thresh}>$ each of $V_{cell1}$, $V_{cell2}$ ... $V_{celln}$ will the charge enable signal 30 be high. Charge enable signal 30 is an input to the driver logic circuitry 18, and generally controls whether the battery 20 will receive a charge from the adapter 12.

One feature of the present invention is that a single path is used for both charging and discharging of the batteries. To accomplish this, the present invention utilizes switches 16 and 32, which are controlled for both charging and discharging operations. The conduction state of switch 16 is controlled by the driver logic 18, which utilizes the charge enable signal 30, a pulse signal generated by the PWM controller 22, and a signal generated by the current monitor. The preferred switch 16 is comprised off a transistor 26 and a body diode 28. The body diode 28 is in reverse bias with respect to the power adapter 12, thereby ensuring that no leakage current is feed into the battery 20. However, to minimize power loss across the body diode 28, it is important to control the transistor 26 so that it is ON when the battery is charging and discharging. Similarly, switch 32 is provided to prevent current from flowing from the battery if there is a short circuit condition at terminals B+/B−. Switch 32 comprises transistor 70 and body diode 72. The body diode is in forward bias with respect to the power adapter 12. Switch 70 is controlled so that during a normal charge or discharge operation, it is in a conduction state, i.e., to permit current to flow into and out of the battery 20. If, however, the discharge current gets beyond a predetermined threshold, transistor 70 is controlled to turn OFF. By way of example, the following is a description of the charging state and discharging state of the circuit shown in FIGS. 1 and 2.

Battery Charging—Charge Enable Signal is High

Figure 2:
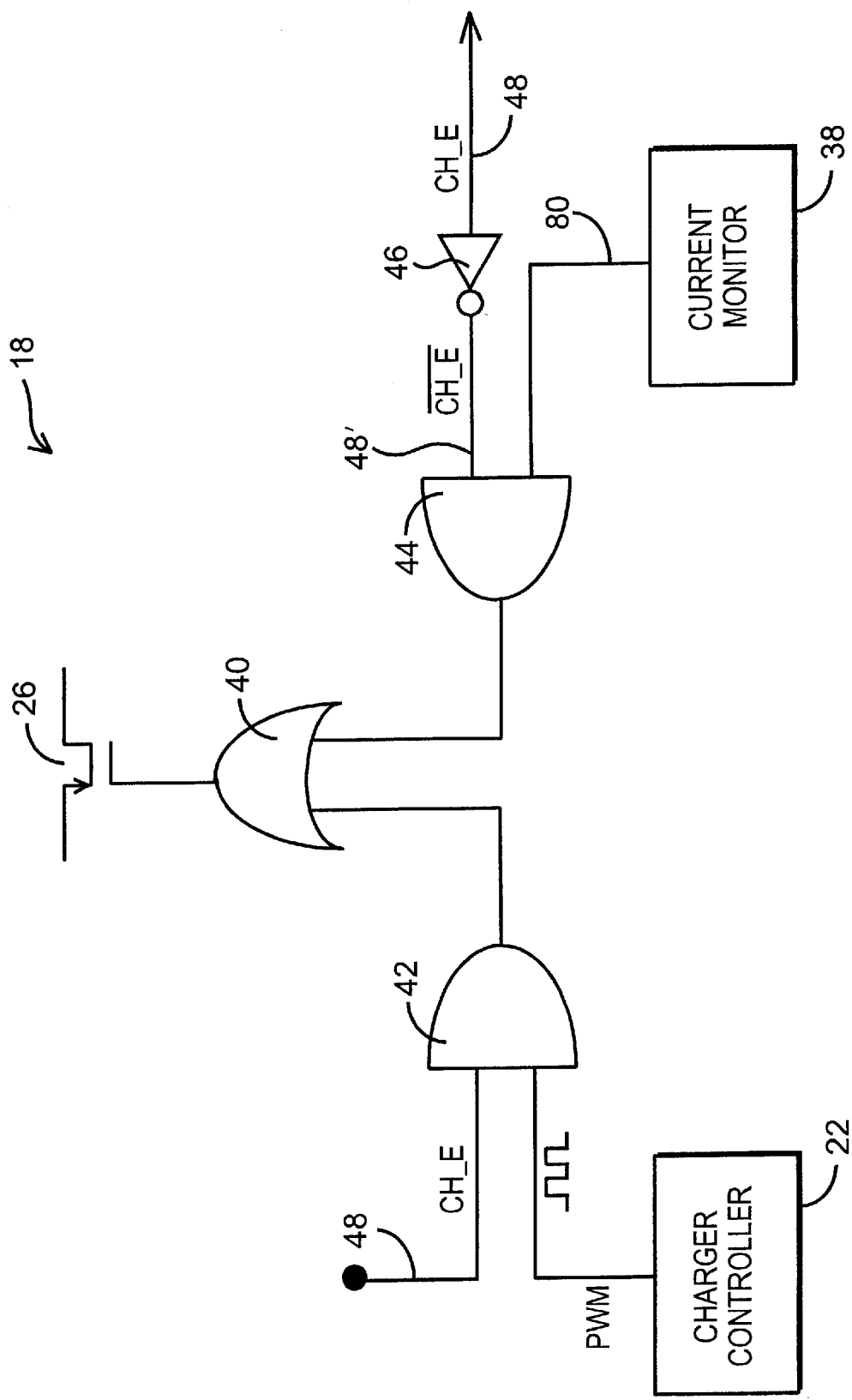
FIG. 2 is an exemplary circuit diagram of the switch control logic of the present invention.

As noted above, the conduction state of transistor 26 is controlled by the driver logic 18, which in turn is a function of the charge enable signal 30 and a battery current signal 80. FIG. 2 depicts an example of the driver logic circuit 18 of the present invention. By way of example, and referring to FIGS. 1 and 2, we assume that charge enable is high, i.e., the adapter 12 is present and the individual cells of the battery 20 are capable of taking a charge. In this case, the output of AND gate 42 is commensurate with the PWM signal, as generated by PWM controller 22. The charge enable signal is also an input to AND gate 44, via inverter 46, thus generating the compliment of the charge enable signal. Since charge enable is high at this time, the output of AND gate 44 is low. The output of gates 42 and 44 are feed into OR gate 40. Switch 26 alternately conducts to provide a charge path for the adapter 12 to supply power to the buck converter 24, thereby generating a charging current to the battery 20. During charging body diode 28 is in reverse bias, and the charging path is defined through switch 26. Switch 26 is preferably a MOS transistor, the gate of which is controlled by the output of OR gate 34, as shown. The PWM controller 22 is controlled by a battery feedback signal 90 indicative of the charge voltage on the battery. Signal 90 dictates the power supplied by the charger controller by adjusting the width of the PWM signal.

Under these conditions, the current monitor circuit 38 also controls switch 70 so that it conducts during charging, as follows. Current monitor circuit 38 preferably comprises a first comparator 76 and second comparator 72, as shown. Comparator 76 compares the voltage across the sense resistor 70 to voltage V1. T Comparator 76 is utilized to close switch 70 if the discharge current becomes greater than a predetermined value, otherwise switch 70 is held in a conducting state. Thus, V1 is chosen to equal $I_{max} \times R_{sense}$. Imax is chosen as the maximum allowable discharge current for that battery, and typically equals 6 A. Comparator 76 compares V1 to $V_{R-sense}$, and if $V1>V_{R-sense}$, comparator generates control signal 82 to hold switch 70 ON (i.e., conducting). Conversely, if $V1<V_{R-sense}$, comparator generates control signal 82 to hold switch 70 OFF (i.e., not conducting). Comparator 76 is provided to prevent an overcurrent condition on the battery, i.e., short-circuit condition. During a charging period, note that output 80 of the current monitor 38 is irrelevant, since the output of AND gate 44 is always LOW (i.e., since charge enable signal 48' is LOW).

Battery Discharging—Charge Enable Signal is Low

Assuming now that the charge enable signal is LOW. In the present example, charge enable can go low if: 1) the adapter 12 is removed from the circuit, thereby making the output of comparator 50 low (FIG. 3), since the voltage at the B+node is less than the battery voltage; and/or 2) any one of the battery cells Cell1, Cells, ... Celln is larger than the preset threshold voltage. (Note, however, that for this second condition, this does not necessarily mean that the battery is discharging). In both these conditions, the output of AND gate 42 is LOW. The charge enable signal 48' is input into AND gate 44. During the transition period between removal of the adapter 12 and supplying battery power to system 14 via transistor 26, the battery power discharge path is defined through the body diode 28 and transistor 70. However, since the power loss through a diode is much greater than that of a transistor (i.e., $P_D>>PMOS$), it is desirable to ensure that the battery does not discharge through the diode 28 for extended periods (e.g., more than 2 ms.). Accordingly, the current monitor 38 also supplies an enabling signal 80 to AND gate 44, as described below. The second comparator 72 of the current monitor 38a compares the battery voltage across sense resistor $R_{sense}$ with a predetermined threshold voltage V2. V2 is a threshold voltage, indicative of a battery discharge state, and can be generalized by a threshold current $I_{Thresh} \times R_{sense}$. Typically, $I_{Thresh}$ is 0.3 A. If the battery discharge current is greater than the threshold, the output of comparator 72 is high. In this case, the output of AND gate 44 is high, thus causing transistor 26 to be ON and conducting. The discharge path is now defined through the transistors 26 and 70. Likewise, if $I_{Batt}$ is less than $I_{Thresh}$, the output of comparator 72 is low, thereby causing switch 26 to turn off. It is desirable to set the threshold at a value less than the minimal turn on voltage for body diode 28, thereby minimizing leakage currents across body diode 28 when switch 26 is OFF. Also, To prevent an over-discharge state for the battery 20, $I_{Thresh}$ is preferably a programmable value that is chosen in accordance with the particular battery used.

In a single battery system, the use of the current comparator 38, and specifically the use of a threshold current to control switch 26, prevents an uncontrolled current from entering the battery if the system adapter 12 is reapplied. For example, with the system adapter 12 removed, the voltage at the battery $V_{Batt}$ and the voltage at node B+ are equal (or very nearly equal). And, as described above, switch 26 is conducting to permit the battery to discharge. If an AC/DC adapter is then applied to node B+, these voltages are still equal, but the switch 26 is still conducting, which can generate damaging currents into the battery. To prevent this situation, the current comparator continually monitors the battery current $I_{Batt}$ with a threshold current. If, in the situation as described above, both a battery current (positive current) and an AC/DC adapter current (negative current) exist across the sense resistor, these two currents will reduce the value of $I_{Batt}$ to below the threshold value, thereby generating a low output from the current comparator 38, and turning switch 26 off. Notice, that when switch 26 is off, body diode 28 is in reverse bias with respect to node B+ (i.e., to any other power source).

Multiple Battery Systems

Another advantage of the present invention over conventional battery charging/discharging topologies is that the circuit of the present invention can be adapted for multiple battery systems. Referring again to FIG. 1, each battery pack 20A, 20B, etc, preferably duplicates the circuit 10 and the circuits shown in FIGS. 2 and 3, and each are coupled in parallel at nodes B+ and B−. Of course, it is not necessary to duplicate such common elements as the charger circuit 22. Thus, the voltage value at node $V_{B+}$ could be indicative of either the presence of an external AC/DC adapter, or another battery source. Since, as described above, the battery only discharges if it's voltage is greater than the node voltage at B+. In this way, it is assured that the power source with the highest voltage (either an adapter, a Battery 20A or another battery 20B) assumes the role of supplying power to the system. Thus, for multiple battery systems, the operation of the circuitry described herein for a single battery is substantially identical, except that now if the B+ node is highest as seen by a particular battery, then this indicates that both the adapter is not present and that the other battery has less voltage.

As with the single battery system of FIG. 1, the current monitor 38 in the multiple battery system prevents a cross-conduction between batteries of different potentials. For example, assume a two battery system where the power adapter 12 is removed. At the time the adapter is removed, both batteries will attempt to supply power to the system, since in both circuits 10 the battery current is greater than the threshold current, and thus the switches 26 will be conducting. However, if battery A has a greater potential than battery B, but battery B is still conducting through switch 26, there will be a cross conductance from battery A into battery B. In the present invention, this will cause a negative current across the sense resistor, which, when added to the battery current, will cause the total current monitored by the comparator 72 to fall below the threshold value, thereby causing the switch 26 to close, and that battery to cease supplying power.

It should be noted that in either the single battery or multiple battery topologies, it is preferable to choose a current threshold value, $I_{Thresh}$, that is very small with respect to the maximum power dissipation on the switch 16. For example, it may be desirable to choose a threshold value of between 0 to 100 mA, for a switch having maximum power dissipation of 1 Watt.

Importantly, the operation and control of the first switch 16, and in particular the operation and control of the transistor 26 is purely analog. Thus, the present invention permits very fast switch times between power delivery by the adapter 12, and power deliver by battery 20A (or 20B). Also, since the preferred driver logic (FIG. 2) is implemented using relatively few components, the present invention achieves switch times in the $\mu$sec. range. Additionally, the fast switch times realized by the present invention permit power delivery to the load without the need for a large system capacitor to energize the system during switch times.

Thus, it is evident that there has been provided battery power management circuit topology that requires only a single path to both charge and discharge batteries, and an intelligent switching mechanism to switch between batteries in a multiple battery system. Those skilled in the art will recognize that many modifications are possible. For example, and referring to FIG. 1B, the current comparator 38' can include a comparator 70 and a threshold voltage source 72, which generates a voltage proportional to a threshold current, i.e., $V_{thresh} = I_{thresh} \times R_{sense}$. Other modifications are possible. For example the exemplary control logic of FIG. 2 could likewise be implemented with other gate technology (e.g., NAND, NOR, etc.) while accomplishing the same function. Alternately, the circuit of FIG. 2 could be replaced with a programmed IC acting as a state machine, as a function of the appropriate inputs. Still other modifications are possible. For example, although FIG. 3 represents a two battery system, it should be noted that the topology of FIGS. 1 and 2 can be duplicated for any number of batteries, and each being connected in parallel at node B+. These and all other modifications as may be apparent to one skilled in the art are deemed within the spirit and scope of the present invention, only as limited by the appended claims.

What is claimed is:

1. A battery charging/discharging circuit comprising:
   a first switch for selectively coupling a battery to a load along a charging/discharging path, or coupling said battery to a power source along said charging/discharging path; and
   a first analog switch controller for selectively controlling the conduction state of said first switch comprising a charge enable signal generator circuit for generating a first control signal indicative of the presence of said power source and the charging status of said battery, and a current comparator for comparing a threshold current to a battery discharge current and for generating a second control signal indicative of the battery discharge current; wherein the conduction state of said switch being controlled by said first or second control signal;

a second switch coupled between said switch and said battery along said charge/discharge path for selectively coupling said battery to said load or said power source; and a second analog switch controller for selectively controlling the conduction state of said second switch comprising a comparator for comparing a maximum battery discharge current to said battery discharge current and generating a third control signal indicative of said battery discharge current; wherein the conduction state of said second switch being controlled by said third control signal.

2. A circuit as claimed in claim 1, wherein said switch comprising a MOSFET transistor and a diode in parallel with said transistor, said diode being in forward bias between said battery and said system.

3. A circuit as claimed in claim 1, wherein said power source includes an AC/DC adapter.

4. A circuit as claimed in claim 1, wherein said charge/discharging path comprises a converter circuit for generating a DC charging current from said power source, and a sense impedance for sensing said current being discharged by said battery.

5. A circuit as claimed in claim 4, wherein said converter circuit includes a buck converter circuit comprising an inductor coupled to said switch and said battery, a capacitor coupled to said inductor and a reference voltage, and a diode coupled to said inductor and said reference voltage and being in forward bias with respect to said reference voltage.

6. A circuit as claimed in claim 1, wherein said battery comprises a plurality of individual battery cells having individual voltages.

7. A circuit as claimed in claim 6, wherein said charge enable signal generating circuit comprising a plurality of first comparator circuits for comparing the voltage of each said battery cell to a threshold voltage and each generating a plurality of first output signals, a first AND gate receiving said first output signals and generating a second output signal, a second comparator for comparing the battery voltage and the power source voltage and generating a third output signal, and a second AND gate receiving said second and third output signals and generating a forth output signal; said current comparator comprising a comparator circuit comparing discharge current supplied by said battery and a threshold current and generating a fifth output signal.

8. A circuit as claimed in claim 7, wherein said switch controller comprises a third AND gate receiving fourth output signal and a pulse signal and generating said first control signal, a fourth AND gate receiving the compliment of said fourth output signal and said fifth output signal and generating said second control signal, and an OR gate receiving said first and second control signals and selectively switching the conduction state of said switch based on said first or second control signals.

9. A circuit as claimed in claim 8, wherein said circuit further comprising a charger control circuit generating said pulse signal, and a feedback signal coupled to said charger control circuit representing the voltage across said battery, wherein the duty cycle of said pulse signal being adjusted by said feedback signal.

10. A circuit as claimed in claim 9, wherein said charger control circuit comprises a pulse width modulator and said pulse signal comprises a pulse width modulated signal.

11. A circuit as claimed in claim 1, wherein said switch comprising a MOSFET transistor and a diode in parallel with said transistor, said diode being in forward bias between said system and said battery.

12. A multiple battery system for delivering power to a load, comprising two or more batteries each having a charge/discharge circuit, respectively, each said charge/discharge circuit being connected in parallel with a load;

a power source coupled in parallel to said load and said batteries;

said charge/discharge circuit comprising:

a first switch selectively coupling said battery to a power source to charge said battery, or coupling said battery to said load;

a first analog switch controller for controlling the conduction state of said switch comprising a charge enable signal generating circuit for coupling said battery to said power source and to a modulated signal source, and a current comparator for comparing a battery discharge current to a threshold current and coupling said battery to said system based on the comparison of said battery discharge current and said threshold current;

a second switch coupled between said switch and said battery along said charge/discharge path for selectively coupling said battery to said load or said power source; and a second analog switch controller for selectively controlling the conduction state of said second switch comprising a comparator for comparing a maximum battery discharge current to said battery discharge current and generating a third control signal indicative of said battery discharge current; wherein the conduction state of said second switch being controlled by said third control signal.

13. A circuit as claimed in claim 12, wherein said switch comprising a transistor and a diode in parallel with said transistor, said diode being in forward bias between said battery and said system.

14. A circuit as claimed in claim 12, wherein said power source includes an AC/DC adapter.

15. A circuit as claimed in claim 12, wherein said charge/discharging path comprises a converter circuit for generating a DC charging current from said power source, and a sense impedance for sensing said current being discharged by said battery.

16. A circuit as claimed in claim 15, wherein said converter circuit includes a buck converter circuit comprising an inductor coupled to said switch and said battery, a capacitor coupled to said inductor and a reference voltage, and a diode coupled to said inductor and said reference voltage and being in forward bias with respect to said reference voltage.

17. A circuit as claimed in claim 12, wherein said battery comprises a plurality of individual battery cells having individual voltages.

18. A circuit as claimed in claim 17, wherein said charge enable signal generating circuit comprising a plurality of first comparator circuits for comparing the voltage of each said battery cell to a threshold voltage and each generating a plurality of first output signals, a first AND gate receiving said first output signals and generating a second output signal, a second comparator for comparing the battery voltage and the power source voltage and generating a third output signal, and a second AND gate receiving said second and third output signals and generating a forth output signal; said current comparator comprising a comparator circuit comparing discharge current supplied by said battery and a threshold current and generating a fifth output signal.

19. A circuit as claimed in claim 18, wherein said switch controller comprises a third AND gate receiving fourth output signal and a pulse signal and generating said first control signal, a fourth AND gate receiving the compliment of said fourth output signal and said fifth output signal and generating said second control signal, and an OR gate receiving said first and second control signals and selectively switching the conduction state of said switch based on said first or second control signals.

20. A circuit as claimed in claim 19, wherein said circuit further comprising a charger control circuit generating said pulse signal, and a feedback signal coupled to said charger control circuit representing the voltage across said battery, wherein the duty cycle of said pulse signal being adjusted by said feedback signal.

21. A circuit as claimed in claim 20, wherein said charger control circuit comprises a pulse width modulator and said pulse signal comprises a pulse width modulated signal.

22. A circuit as claimed in claim 12, wherein said switch comprising a MOSFET transistor and a diode in parallel with said transistor, said diode being in forward bias between said system and said battery.

23. A method for controlling the charging and discharging of a battery, said method comprising the steps of:

coupling a battery to a load along a charging/discharging path through a switch, coupling said battery to a power source along said charging/discharging path through said switch;

generating a first analog control signal indicative of the presence of said power source and the charging status of said battery;

generating a second analog control signal indicative of the battery discharge current;

selectively controlling the conduction state of said switch using said first or second control signal;

wherein generating said first analog control signal comprising the steps of:

comparing the voltage of each said battery cell to a threshold voltage and each generating a plurality of first output signals;

ANDing said first output signals and generating a second output signal;

comparing the battery voltage and the power source voltage and generating a third output signal;

ANDing said second and third output signals and generating a forth output signal;

ANDing said fourth output signal and a pulse width modulated signal and generating said first analog control signal.

24. A method as claimed in claim 23, further comprising the step of generating a DC charging current from said power source.

25. A method as claimed in claim 23, wherein generating said second analog control signal comprising the steps of:

comparing said discharge current supplied by said battery and a threshold current and generating a fifth output signal; and ANDing the compliment of said fourth output signal and said fifth output signal and generating said second control signal.

26. A method as claimed in claim 25, further comprising the step of

ORing said first and second analog control signals and selectively switching the conduction state of said switch based on said first or second control signals.

27. A method as claimed in claim 23, further comprising the steps of coupling said pulse width modulated signal to said switch and generating a battery charging signal to deliver charging current to said battery when said battery is coupled to said power source through said switch.

28. A method as claimed in claim 27, further comprising the steps of:

generating a feedback signal indicative of the current delivered to said battery; and adjusting the duty cycle of said pulse width modulated signal based on said feedback signal.

29. A method as claimed in claim 23, further comprising the steps of:

coupling said battery to said load or said power source through a second switch along said charging/discharging path;

generating a third control signal indicative of the discharge current generated by said battery; and selectively controlling the conduction state of said second switch using said third control signal.

30. A method as claimed in claim 29, wherein generating said third control signal comprises the step of comparing said discharge current to a maximum permitted discharge current; wherein if said discharge current is less than said maximum discharge current, said conduction state of said second switch is closed to permit current to enter or exit said battery; and wherein if said discharge current exceeds said maximum permitted discharge current, said conduction state of said second switch is opened to create an open circuit between said battery, and said power supply and said load.

* * * * *